United States Patent Office 2,941,904
Patented June 21, 1960

2,941,904

HIGH TEMPERATURE GLASS FIBER INSULATION PRODUCT AND METHOD FOR MANUFACTURING SAME

Joseph P. Stalego, Newark, Ohio, assignor to Owens-Corning Fiberglas Corporation, a corporation of Delaware No Drawing. Filed Aug. 31, 1955, Ser. No. 531,818

12 Claims. (Cl. 117—126)

This invention relates to a bonded glass fiber product and to the method and materials used in the manufacture of same and it relates more particularly to the manufacture of a bonded glass fiber insulation product which is adapted for use at high temperatures such as a molded insulation, pipe wrap or the like.

This application is a continuation-in-part of my co-pending application Ser. No. 474,617, filed December 10, 1954, and entitled "Bonded Fibrous Insulation and Method for Manufacturing Same."

Relating to the discussion of bonded glass fiber structures of the type heretofore produced, reference is made in the aforementioned copending application to the use of glass fibers in the formation of insulation products ranging from a soft and resilient pad capable of substantial deformability having a density as low as 1–3 pounds per cubic foot and containing about 0.5–2.5 percent by weight resinous binder to a relatively dense and hard molded product of substantially permanent shape having a density as high as 40–45 pounds per cubic foot and containing as much as 20–30 percent by weight resinous binder.

For the most part, use has been made of a phenol formaldehyde resinous material for use as the binder with glass fibers in the manufacture of such molded or bonded insulation products. In the great majority of applications, especially when the binder is used in combination with glass fibers of the staple type, use is also made of an oil incompatible with thermosetting resinous materials for purposes of lubricating the fibers whereby the applied liquid binder is caused to migrate to the fiber intersections where more efficient use can be made of the binder for securing the fibers one to another in the insulation product.

Instead of a phenol formaldehyde resin, use has been made of a Vinsol modified phenol formaldehyde resin, cresol formaldehyde resin, resorcinol formaldehyde resin and other modifications of phenol aldehyde type resinous materials embodying flexibilizing agents such as butadiene-acrylonitrile copolymers and the like. In the more expensive insulation products, where light color is desired and which may be used as surface paneling for insulation, the resinous binder employed is generally of the type formed of urea formaldehyde, melamine formaldehyde, methylated diurea-urea formaldehyde resins and the like.

While the organic resinous binders of the type described are relatively inexpensive and easy to apply for use in the manufacture of molded and bonded glass fiber insulation products, the thermal limitations imposed by the use of such organic resinous binders are in conflict with the high temperature stability characteristics of the glass fibers. For example, the glass fibers can be used at temperatures up to the fusion temperature of the glass composition of which the fibers are formed, such as temperatures in the order of 1200° F., without deterioration. On the other hand, the organic resinous materials of the type described are subject to thermal breakdown at temperatures starting at about 300° F. such that glass fiber insulation products making use of such resinous materials are limited to use in fields where the temperature conditions existing will not exceed 300–350° F. over extended periods of time or 400–425° F. over a very short period of time, otherwise the binder will deteriorate with the danger of causing punking of the resin, especially when the temperature exceeds about 425° F.

It is an object of this invention to produce and to provide a method for producing an improved insulation product formed of glass fibers which is capable of use at elevated temperatures without deterioration, which resists punking when exposed to temperatures in excess of 425° F. and which makes use of a binder composition which can be formulated in a simple and efficient manner of relatively low cost materials and which can be applied as a binder to glass fibers in the manufacture of bonded glass fiber structures, and which is capable of being cured relatively rapidly at a low temperature without the release of excessive fumes, and it is a related object to produce a new and improved binder composition for use in the manufacture of same.

For better utilization of the inert characteristics of glass fibers in the manufacture of high temperature insulation products, numerous investigations have been made on the formulation of binder compositions which retain the low cost and ease of use of the phenol formaldehyde resinous materials but which are not subject to the low temperature break-down and punking which is secured in the use of such resinous materials with glass fibers in the manufacture of insulation products.

In the aforementioned copending application, description is made of the manufacture of a glass fiber insulation product having improved heat stability wherein use is made of a new binder composition formulated of the combination of an alkyd or polyester resin and a urea borate resinous condensation reaction product. It was found that the alkyd resinous materials enjoyed considerably greater heat stability than the phenol formaldehyde, urea formaldehyde, or melamine formaldehyde and the like thermosetting resinous materials theretofore employed as wool binders. Such alkyd resinous materials were therefore preferred from the standpoint of heat stability but their use alone was undesirable because the curing rate of the alkyd type resinous materials was so slow as to make it impractical to use the alkyd resinous materials alone as a binder.

It was found further, in accordance with the practice of the desired invention, that the combination of the heat curable alkyd resinous materials with a urea borate condensation reaction product not only increased the heat stability of the binder composition and did not only improve the working and shelf life of the binder but, more importantly, the combination of the urea borate with the alkyd resin tended to increase the curing rate of the binder to the extent that use could be made thereof with glass fibers in the manufacture of bonded or molded insulation products.

It has now been found that a binder composition of the type described based upon the use of a heat curable alkyd resinous material in combination with a urea borate condensation reaction product can be improved further by the modification to include a thermosetting phenol formaldehyde resinous condensation reaction product as a component thereof in amounts less than 10 percent by weight of the binder when calculated on a solids basis and preferably when used in amounts ranging from about 3–7 percent by weight.

The combination to include a phenol formaldehyde-heat curable resinous material as a component of the binder composition has been found to offer a vast number of unexpected and very desirable improvements. When present in the amounts described, the phenol formaldehyde resin functions further to accelerate the rate of cure of the binder composition to the extent that application and use can be made with conventional processing equipment and machines operating under conditions comparable to those heretofore employed with such resinous binders as phenol formaldehyde resin, urea formaldehyde resin and the like. The presence of the phenol formaldehyde resin in combination with the alkyd resin and urea borate appears also to result in the formation of a harder film which gives a firmer and more resilient insulation product upon cure.

In addition to the increase in the rate of cure, the improved binder composition containing the phenol formaldehyde resin cures at a lower temperature with the formation of less fumes and with the result that numerous economies may be practiced in the use of such binder composition for the manufacture of molded or bonded glass fiber insulation products. Further, the combination to include a phenol formaldehyde resin as a component in the binder composition further reduces the cost of the binder and correspondingly the cost of the molded or bonded insulation product manufactured thereof.

By way of illustration, but not by way of limitation, the following will set forth binder compositions representative of the practice of this invention in the manufacture of bonded or molded glass fiber insulation products:

*Example 1*

65 percent by weight alkyd resin (Hercules Powder A49)
30 percent by weight urea borate condensation reaction product
5 percent by weight phenol formaldehyde resin in an A or B stage

*Example 2*

65 percent by weight alkyl resin
29 percent by weight urea borate
5 percent by weight phenol formaldehyde resin
2 percent by weight tempering oil

*Example 3*

53.0 percent by weight alkyd resin (Hercules Powder G62, 75% solids)
35.0 percent by weight urea borate (Booty Resineers, Tybon 4511)
7.5 percent by weight phenol formaldehyde resin
4.5 percent by weight tempering oil

*Example 4*

62.2 percent by weight alkyd resin (Hercules Powder A–49–75W alkyd)
28.0 percent by weight urea borate
4.8 percent by weight phenol formaldehyde resin
5.0 percent by weight tempering oil

*Example 5*

54.0 percent by weight alkyd resin (Hercules Powder G62)
36.2 percent by weight urea borate (Tybon 5411)
7.7 percent by weight phenol formaldehyde resin
2.1 percent by weight tempering oil

*Example 6*

45–65 percent by weight alkyd resin
30–50 percent by weight urea borate
1–10 percent by weight phenol formaldehyde resin
1–5 percent by weight oleaginous lubricant (when present)

In the above examples, the amounts are given on the basis of solids by weight. It is possible to make use of an organic solvent for dilution of the materials in the foregoing examples in the preparation of a fluid composition for use in the treatment of glass fibers. However, from the standpoint of economy and freedom of use, it is preferred to employ an aqueous system in which the materials of the foregoing examples are contained in the described ratios in amounts to provide a composition having 10–30 percent by weight solids and preferably 15–25 percent by weight. In general, the alkyd resinous ingredient will be soluble in the aqeous medium and the urea borate condensation reaction product appears to be at least sufficiently soluble to enhance the formation of a stable aqueous system in which the oleaginous lubricant is contained as a dispersed phase therein. The phenol formaldehyde resin can be dissolved in the aqueous system if introduced while in the A stage or else the phenol formaldehyde resinous material may be introduced as an aqueous dispersion. The stability of the treating composition is further enhanced by the further addition of small amounts of ammonium hydroxide usually in amounts less than 0.5 percent by weight of the treating composition. Instead of ammonium hydroxide, use may be made of other corresponding compounds capable of reacting as an amine.

By way of example, a binder composition formulated of the materials in the ratios set forth in Examples 3 and 5 may be combined to provide 900 pounds by weight of binder solids with 2300 pounds by weight of water and to which 9 gallons of 28° Bé. ammonium hydroxide is added.

The procedures for application and cure are similar to those employed in present processes which make use of phenol formaldehyde resin or Vinsol extended resin in that the binder composition may be sprayed onto the glass fibers in the desired amounts as the fibers are rained down from above through a forming hood for deposit in interfelting relation to form a mat or a bat on a laterally moving collecting belt. In the alternative, the binder may be sprayed, dipped or flow-coated onto a mat or bat of glass fibers or onto a mass of glass fibers which have previously been formed to a desired shape such as for use in molding into a pipe wrap. The amount of binder composition required for securing the glass fibers in the desired bonded or molded relation is also similar to that employed in present processes and the amount will depend further upon the density of the insulation product and the strength or porosity desired therein. For low density insulations having a specific gravity of less than 3 pounds per cubic foot, the amount of binder solids applied may range from 0.5–3.0 percent by weight of the glass fibers. For higher densities and for more rigidly molded products, the amount of binder may be increased to 10, 15 or 30 percent by weight, but it is preferred to make use of concentrations ranging from 5–15 percent by weight binder solids after cure based upon the weight of the glass fibers.

When applied in the desired amounts, the curing cycle, such for example as used in the manufacture of pipe insulation having from 5–15 percent by weight binder, will be completed in the order of 40 seconds to 2½ minutes at a temperature of 450–650° F. It will be understood that the cure time will vary somewhat with the amount of resinous binder, the density of the molded product and the thickness of the layer of glass fibers and that it will vary inversely with the temperature of cure.

As the alkyd resinous component, as used in the description and in the examples and claims, use may be made of most heat curable condensation reaction products of a polyhydric alcohol and a polybasic acid. It is preferred however to make use of a reaction product of the type described in the Kneisley Patent No. 2,646,410 wherein a polyhydric alcohol such as pentaerythritol is reacted with an unsaturated dicarboxylic acid such as maleic anhydride or maleic or fumaric acid and a glycol such as ethylene glycol which is present in amounts up to 15 percent by weight of the resin forming materials. An alkyd of this character is referred to in the foregoing examples as A49, manufactured by Hercules Powder Company. The alkyd referred to as G62 is similar except that about 3 percent by weight of boric acid is substituted for an equivalent amount of maleic acid in the resin formulation.

The term "urea borate" as used in the description, examples and claims is meant to include the condensation reaction product of urea, boric acid and an aldehyde with some ethylene glycol added. A typical formulation of a urea borate which may be employed in the practice of this invention is represented by the following:

*Example 7*

5 parts by weight formaldehyde
4 parts by weight urea
2.5 percent by weight boric acid based upon the total weight of formaldehyde and urea
10 percent by weight ethylene glycol based upon the total weight of formaldehyde and urea In preparation, the materials are combined and heated up to reflux temperature for resinification. A suitable urea borate condensation product of the type described is supplied by Booty Resineers under the trade name "Tybon 5411."

In the manufacture of urea borate, other polyhydric alcohols such as diethylene glycol, propylene glycol, glycerol and the like may be substituted for ethylene glycol. Other nitrogen based aldehyde resins, such as dicyandiamide formaldehyde, melamine formaldehyde, urea formaldehyde or guanidine formaldehyde may be substituted in part for the urea borate. For purposes of description, it will be understood that the term "urea borate" will include such other modifying compounds and it will be further understood that the ingredients of the urea borate may be varied in amounts within reasonable limitations well known to the art.

The phenol formaldehyde resinous materials are represented by the conventional phenol formaldehyde or cresol formaldehyde resinous condensation products used in the manufacture of bonded insulation products or molded products. Use may be made of a phenol formaldehyde resinous reaction product advanced to an A or water soluble stage or use may be made of a phenol formaldehyde type resinous reaction product advanced to a B or water insoluble stage. Instead, use may be made of the reaction products of cresol formaldehyde, resorcinol formaldehyde and the like phenol aldehyde type condensation reaction products.

As used herein, the term "glass fibers" is intended to include glass fibers of the type produced by the attenuation of molten streams of glass by blasts of high pressure steam or air directed angularly downwardly onto the streams as they issue from a glass melting bushing, as described in Slayter et al. Patent No. 2,206,058, or in the Simison et al. Patent No. 2,189,840. Instead, use may be made of the more recently developed superfine glass wool fibers which are formed by burner blast blown systems. In addition to the glass wool and superfine fibers, glass fibers capable of use in the practice of this invention for the manufacture of insulation products may be prepared of continuous glass fibers cut or chopped to shorter lengths or else use may be made of continuous glass fibers and yarns of endless lengths which are deposited in swirl patterns and the like and in which such continuous fibers may be used alone or in combination with the wool or staple type fibers in the formation of bats and mats for use with binders in the manufacture of insulation products.

While the amount of urea borate, alkyd resin and phenol formaldehyde resin may be varied over fairly wide ranges, it is desirable to make use of the materials within the ratio of 10–80 parts by weight of alkyd resin, 80–10 parts by weight of urea borate and 1–10 parts by weight of the phenol formaldehyde resin. In the preferred practice of this invention, the described materials are preferably maintained within the ratio of 45–65 parts by weight of the alkyd resin, 30–50 parts by weight of the urea borate condensation reaction product and 3–7 parts by weight of the phenolic resinous component.

When an oleaginous lubricant is employed in the binder composition, such as an emulsifiable oil of the type sulfonated oils, high flash lubricating oils, tempering oils, or other lubricants of the type described in the Bone et al. Patent No. 2,107,284, the lubricant may be added to the binder composition in amounts up to 5 percent by weight based upon the binder solids although it is preferred to make use of an amount less than 2 percent by weight of the lubricating component.

In practice, insulation products molded or bonded with a binder system of the type described are capable of use under elevated temperature conditions without punking or deterioration and the cured product is also capable of use under moisture or high humidity conditions without excessive swelling or moisture absorption. For example, an insulation product in the form of pipe wool bonded with one of the foregoing resinous binder compositions and molded to a density of about 7 pounds per cubic foot is capable of withstanding the Coast Guard Hot Rivet test without failure. When applied at a thickness of 3 inches to a 500° F. pipe to which 1 kilowatt of electrical energy is applied per minute for 3 minutes to a resistance coil placed in the center of the installation whereby the coil reaches a temperature of approximately 1700° F., no evidence has been found of any punking of the binder or excessive deterioration of the binder placed in close proximity to the heated coil or the hot pipe.

When tested under accelerated conditions at 120° F. and 95 percent relative humidity, no corrosion was found to exist on cold rolled steel, aluminum, or copper after 96 hours exposure. A maximum of 1.7 percent moisture is absorbed and the amount of swelling is less than 8 percent in an insulation product of the type described. When the bonded insulation product is immersed and soaked for 8 hours in water containing a wetting agent and then dried over night in an air circulating oven, no apparent change was evidenced in the thickness of the product or in the resilience of the product.

In an operational test, a section of insulation molded for use as a pipe insulation showed only slight evidences of thermal decomposition when placed in position of use for 24 hours on a pipe maintained at a temperature of 450° F. On the other hand, a similar type of molded pipe section bonded with conventional phenol formaldehyde resinous materials became charred through at least one-third of the thickness of the insulation product under similar conditions.

It has been found that high temperature insulation products of the type heretofore described can be further improved by the treatment with a composition containing silicic acid alone or in combination with an organic filler and/or an organic borate, such as urea borate, to impregnate the previously formed bonded glass fiber insulation product. It is believed that the silicic acid which is present alone or in combination with the other materials in the bonded glass fiber structure forms into a binder at normal curing temperature. At elevated temperatures leading to the destruction of the organic components of the original binder, further fusion of the inorganic components of the binder with the glass fibers occurs which results in a harder, more rigid, less dusty binder to take over for the original binder in maintaining the integrity of the bonded or molded glass fiber structure.

In this capacity, the silicic acid is aided greatly by the combination therewith of a urea borate. As the urea borate used with silicic acid, it is preferred to make use of the condensation product of equimolecular ratios of boric acid, urea and ethylene glycol. The urea borate is believed to function in combination with the silicic acid to increase the resistance of the basic binder to punking and thermal decomposition and it functions in the hereinafter described system to improve the film forming characteristics of the silicic acid binder when used alone or in combination with inorganic, siliceous fillers.

It will be understood that the invention herein includes not only the use of silicic acid alone or in combination with urea borate and/or organic fillers as an impregnant for bonded or molded glass fiber insulation products prepared in accordance with the foregoing concepts of this invention but that it includes also the use of such silicic acid compositions in the treatment of glass fiber insulation products wherein use is made of a binder composition formulated of an alkyd resin and urea borate in the absence of the additional phenol formaldehyde resinous component, as described and claimed in the aforementioned copending application.

As described in the copending application, the alkyd-urea borate may be present in such binder compositions in the ratio of 90–10 parts by weight of alkyd resin to 10–90 parts by weight of urea borate but the materials are preferably present in the ratio of 55–80 parts by weight of alkyd resin to 45–20 parts by weight of urea borate with the allowance of 5 percent free boric acid by way of addition to the above components. When a lubricant is present, an amount within the range previously described may be used, that is between 1–5 percent by weight and preferably less than 2 percent by weight of the binder solids.

By way of example, the following will illustrate binder compositions of the type which may be included in this phase of the invention for use in manufacture of bonded glass fiber structures to be subsequently impregnated with the silicic acid composition in accordance with the further practice of this invention:

Example 8

65 percent by weight alkyd resin (Hercules A–49–85W)
35 percent by weight urea-borate (Tybon 5411)
3 percent by weight boric acid based on the total weight of resin solids used
0.3 percent by weight emulsified high flash lubricating oil based on the total solids of resinous binder

Example 9

65 percent by weight alkyd resin (formed by the condensation of pentaerythritol and maleic acid with 10–15 percent ethylene glycol)
35 percent by weight urea-borate (formed by the reaction of urea formaldehyde, boric acid and ethylene glycol)
0.3 percent by weight emulsified oil (Kendex 0836)

Example 10

70 percent by weight alkyd resin
30 percent by weight urea-boric acid-formaldehyde ethylene glycol condensation product (Tybon 5411)

Example 11

55–80 percent by weight alkyd resin (pentaerythritol, maleic acid and ethylene glycol condensation reaction product)
45–20 percent by weight urea-borate condensation product
.1 percent by weight emulsified lubricating oil Silica gell and colloidal silica are believed to function similarly to silicic acid and such other materials shall be understood to be included when reference herein is made to the term "silicic acid." When used alone, it is sufficient to introduce from 20–200 parts by weight of silicic acid into the bonded glass fiber structure based upon the weight of the structure. The amount introduced depends greatly upon the density of the bonded glass fiber structure and the properties or characteristics desired in the final product. Application of the silicic acid can be made from solutions of the silicic acid in aqueous medium in concentrations ranging from 5–50 percent by weight.

The following will illustrate the use of a silicic acid alone in the treatment of glass fiber structures in accordance with the practice of this invention:

Example 12

A glass fiber structure bonded with a resinous composition represented by any of the foregoing examples and cured is impregnated until saturated with a silicic acid solution containing approximately 23 percent solids. A suitable composition is supplied by E. I. du Pont de Nemours Co. under the trade name "Ludox" or as supplied by Monsanto Chemical Company under the trade name "Syton."

Excess silicic acid is removed from the bonded structure by suction and then the structure is baked for 1–30 minutes at a temperature below 1300° F. and preferably within the range of 350–600° F.

Example 13

Glass fibers bonded with an aldehyde-urea borate or an alkyd-urea borate phenol formaldehyde system is first wetted out with a 3 percent solution of a surface active agent such as a quaternary ammonium salt to enhance the wetting out of the bonded mass with the subsequent solution of silicic acid. After drying, the bonded glass fiber structure is immersed in a composition containing 15–30 percent by weight silicic acid and 0.2–1.0 percent by weight of a hydrophilic colloid such as ammonium alignate which is present to thicken the composition and prevent excessive drainage. Excesses of the silicic acid composition can be removed by suction and the product baked at a temperature of about 500° F. for 15–25 minutes.

When present, the siliceous filler functions chiefly to extend the silicic acid and to improve the characteristics of the film that is formed upon heating. As the siliceous filler, it is preferred to make use of a clay such as kaolin clay, but use can be made of other materials such as aluminum silicate, silica, bentonite, calcium carbonate and the like in finely divided form. When used, the amount of siliceous filler is preferably maintained within the ratio of 1 part by weight silicic acid to 1–4 parts by weight of the siliceous filler. A binder composition representative of the use of a filler in combination with silicic acid may be represented by the following:

Example 14

1.5–2.0 parts by weight kaolin clay
1 part by weight silicic acid
Water in amounts to provide a composition having 20–35 percent by weight solids As previously pointed out, a urea borate is preferably used in combination with the silicic acid, alone or with an inorganic filler, for improving the punking characteristics and the physical and thermal properties of the bonded glass fiber structure. The urea borate is substantially similar to that previously employed in the basic binder for use with the glass fibers in the manufacture of the bonded glass fiber structure. Instead of the composition of the type illustrated, as represented by the trade name "Tybon 5411," use is preferably made of a further modification wherein the urea, boric acid and glycol are present in substantially equimolecular proportions for reaction with the aldehyde. A composition corresponding thereto is marketed by Booty Resineers under the trade name "Tybon 1016B."

In the use of a urea borate in combination with silicic acid, it is preferred to embody the materials in the ratio of 1 part by weight of silicic acid to 0.1–1.5 parts by weight of urea borate and preferably with materials in about equal parts by weight. In the system which includes a siliceous filler, the preferred ratio would be 1 part by weight silicic acid, 0.1–1.5 parts by weight urea borate and 1–4 parts by weight of siliceous filler.

The following will represent treating compositions embodying the use of silicic acid with urea borate:

Example 15

0.4 parts by weight organic borate (Tybon 1016B—condensation product of urea, boric acid, glycol and formaldehyde)
1.0 parts by weight silicic acid
Water in amounts to produce a mixture having 20 percent solids

Example 16

41 parts by weight silicic acid
18 parts by weight urea borate (condensation product of urea, boric acid and glycol)
41 parts by weight Canary clay
Water in amounts to produce a mixture having 25 percent solids

Example 17

1½–4 parts by weight filler
1 part by weight silicic acid
0.2–1.0 parts by weight organic borate (urea, boric acid, glycol and formaldehyde)

Example 18

1½–2 parts by weight siliceous filler
1 part by weight silicic acid
0.2–0.5 parts by weight organic borate (Tybon 1016B)
Water in amounts to provide a composition having 20–35 percent by weight solids

Example 19

50 parts by weight hydrous aluminum silicate clay
25 parts by weight urea borate (Tybon 1016B)
25 parts by weight silicic acid
360 parts by weight water
Small amount of wetting agent and anti-foaming agent, as needed

Example 20

1 part by weight kaolin clay
1 part by weight silicic acid
1 part by weight urea borate—glycol condensation reaction product.

The above materials are combined in the described ratios in aqueous medium and in amounts to provide from 17–35 percent by weight solids. The kaolin clay or other siliceous filler, which is insoluble in aqueous medium is dispersed with the silicic acid and then combined with the partially soluble urea borate condensation product in water to form a stable mixture in which some agitation may be desirable to maintain uniformity of distribution of the materials.

The bonded glass fiber structure is saturated with the treating composition either by a flow-coat process or by immersion of the bonded glass fiber structure in a bath of the composition. The treating composition is then allowed to drain from the base and where more rapid drainage is desired, such means may be employed. It is desirable to permit sufficient of the treating composition to remain in the base to provide a coating weight of about 15–35 percent based upon the weight of the final product. The treating composition may be allowed to air dry but it is preferred to bake the product at elevated temperature for reaction of the silicic acid with urea borate. For this purpose, temperatures in excess of 400° F. up to 700° F. or more are preferably employed for a time depending greatly upon the density and thickness of the base and the ability to eliminate water from the treating composition in the interior thereof.

The glass fiber insulation product embodying such subsequent treatments as are herein described are capable of withstanding the Coast Guard Hot Rivet test which consists of putting a ½ pound rivet heated to 1650° F. in a cubic foot of insulation without causing a temperature rise of as much as 50° F. at spaced points in the product.

The product does not punk when the molded product is placed on a hot plate heated slowly up to a temperature of 1000° F.

Decomposition does not occur when the molded product is applied as an insulation of 2 inches onto a pipe maintained at a temperature of 685° F. Under similar circumstances, insulation products molded with phenol formaldehyde resin or other conventional resinous binders would punk and the binder would char relatively rapidly so that the insulation product would become broken down in a relatively short time.

It is understood that changes may be made in the details of formulation, application and treatment without departing from the spirit of the invention, especially as defined in the following claims.

I claim:

1. A bonded insulation product formed of glass fibers and a binder securing the fibers one to another in a porous structure wherein the binder comprises the combination of 10–80 parts by weight of an alkyd resin in a heat curable stage, 80–10 parts by weight of a urea-borate condensation reaction product, and up to 10 percent by weight of the binder of a phenol-aldehyde resin in a heat curable stage.

2. A bonded insulation product formed of glass fibers and a binder securing the fibers one to another in a porous structure in which the binder is formed of a combination of 45–65 parts by weight of an alkyd resin, 30–50 parts by weight of a urea-borate condensation reaction product and 3–7 percent by weight of the binder of a phenol-aldehyde resin advanced together to a cured stage on the glass fiber surfaces.

3. A bonded insulation product as claimed in claim 2 in which a lubricant is present on the glass fiber surfaces in amounts ranging from 1–5 percent by weight of the binder.

4. A bonded insulation product as claimed in claim 2 in which the binder is present on the glass fibers in amounts ranging from 1–30 percent by weight of the glass fibers.

5. A high temperature insulation product comprising glass fibers and a binder on the glass fiber surfaces for securing the fibers one to another in the product, in which the binder is formed of materials in combination selected from the group consisting of an alkyd resin in a heat curable stage and a urea-borate condensation reaction product present in the ratio of 10–90 parts by weight of urea borate to 90–10 parts by weight of the alkyd resinous component, and an alkyd resin in a heat curable stage, a urea-borate condensation reaction product and a phenol-aldehyde resin in a heat curable stage present in the ratio of 10–80 parts by weight of the alkyd resin, 80–10 parts by weight of the urea borate and 1–10 percent by weight of the binder of phenol formaldehyde resin, either of which in combination are advanced to a cured state on the glass fiber surfaces, and a secondary binder in the form of silicic acid present in uniform distribution throughout the bonded porous glass fiber structure.

6. A high temperature insulation product as claimed in claim 5 in which the secondary binder is formed of the combination of the silicic acid and a siliceous filler present in the ratio of 1 part by weight of silicic acid to 1–4 parts by weight of the siliceous filler.

7. A high temperature insulation product as claimed in claim 5 in which the secondary binder present in uniform distribution throughout the bonded glass fiber structure is formed of a silicic acid and a urea-borate in which the materials are present in the ratio of 1 part by weight of silicic acid to 0.1–1.5 parts by weight urea-borate.

8. A high temperature insulation product as claimed in claim 5 in which the secondary binder present in uniform distribution throughout the bonded glass fiber structure is formed of the combination of a silicic acid, urea-borate and siliceous filler present in the ratio of 1 part by weight of silicic acid, 0.1–1.5 parts by weight urea-borate and 1–4 parts by weight siliceous filler.

9. The method of fabricating a high temperature insulation product comprising the steps of depositing glass fibers in the desired arrangement for manufacture of the insulation product, applying a primary binder composition to the glass fiber surfaces in which the binder is formed of materials selected from the group consisting of the combination of an alkyd resin in a heat curable stage and a urea-borate condensation reaction product present in the ratio of 10–90 parts by weight of urea borate and 90–10 parts by weight of the alkyd resinous component and the combination of an alkyd resin in a heat curable stage, a urea-borate condensation reaction product and a phenol-aldehyde resin in a heat curable stage present in the ratio of 10–80 parts by weight of the alkyd resin, 80–10 parts by weight of the urea borate and 1–10 percent by weight of the binder of phenol formaldehyde resin, heating the glass fibers with the binder composition thereon to advance the binder to a cured stage on the glass fiber surfaces, impregnating the porous mass of bonded glass fibers with a solution of silicic acid, and setting the silicic acid in the bonded glass fiber structure.

10. The method of fabricating a high temperature insulation product comprising the steps of depositing glass fibers in the desired arrangement for manufacture of the insulation product, applying a primary binder composition to the glass fiber surfaces in which the binder is formed of materials selected from the group consisting of the combination of an alkyd resin in a heat curable stage and a urea-borate condensation reaction product present in the ratio of 10–90 parts by weight of urea borate and 90–10 parts by weight of the alkyd resinous component and the combination of an alkyd resin in a heat curable stage, a urea-borate condensation reaction product and a phenol-aldehyde resin in a heat curable stage present in the ratio of 10–80 parts by weight of the alkyd resin, 80–10 parts by weight of the urea borate and 1–10 percent by weight of the binder of phenol formaldehyde resin, heating the glass fibers with the binder composition thereon to advance the binder to a cured stage on the glass fiber surfaces, impregnating the porous mass of bonded glass fibers with a liquid composition in which the solids are formed of a silicic acid and a siliceous filler present in the ratio of 1 part by weight silicic acid to 1–4 parts by weight of siliceous filler and heating the impregnated mass for reaction to set the materials in the bonded glass fiber structure.

11. The method of fabricating a high temperature insulation product comprising the steps of depositing glass fibers in the desired arrangement for manufacture of the insulation product, applying a primary binder composition to the glass fiber surfaces in which the binder is formed of materials selected from the group consisting of the combination of an alkyd resin in a heat curable stage and a urea-borate condensation reaction product present in the ratio of 10–90 parts by weight of urea borate and 90–10 parts by weight of the alkyd resinous component and the combination of an alkyd resin in a heat curable stage, a urea-borate condensation reaction product and a phenol-aldehyde resin in a heat curable stage present in the ratio of 10–80 parts by weight of the alkyd resin, 80–10 parts by weight of the urea borate and 1–10 percent by weight of the binder of phenol formaldehyde resin, heating the glass fibers with the binder composition thereon to advance the binder to a cured stage on the glass fiber surfaces, impregnating the porous mass of bonded glass fibers with a liquid composition in which the solid materials are formed of silicic acid and a urea-borate condensation reaction product present in the ratio of 1 part by weight of silicic acid to 0.1–1.5 parts by weight of the urea-borate, and heating the impregnated mass for reaction to set the materials in the bonded glass fiber structure.

12. The method of fabricating a high temperature insulation product comprising the steps of depositing glass fibers in the desired arrangement for manufacture of the insulation product, applying a primary binder composition to the glass fiber surfaces in which the binder is formed of materials selected from the group consisting of the combination of an alkyd resin in a heat curable stage and a urea-borate condensation reaction product present in the ratio of 10–90 parts by weight of urea borate and 90–10 parts by weight of the alkyd resinous component and the combination of an alkyd resin in a heat curable stage, a urea-borate condensation reaction product and a phenol-aldehyde resin in a heat curable stage present in the ratio of 10–80 parts by weight of the alkyd resin, 80–10 parts by weight of the urea borate and 1–10 percent by weight of the binder of phenol formaldehyde resin, heating the glass fibers with the binder composition thereon to advance the binder to a cured stage on the glass fiber surfaces, impregnating the porous mass of bonded glass fibers with a liquid composition having solids formed of silicic acid, urea-borate and siliceous filler present in the ratio of 1 part by weight silicic acid, 0.1–1.5 parts by weight urea-borate and 1–4 parts by weight siliceous filler, and heating the impregnated mass for reaction to set the materials in the bonded glass fiber structure.

References Cited in the file of this patent

UNITED STATES PATENTS

| | | |
|---|---|---|
| 2,370,046 | Keyes | Feb. 20, 1945 |
| 2,428,752 | Hewett | Oct. 7, 1947 |
| 2,491,409 | Klopa | Dec. 13, 1949 |
| 2,501,783 | Morgan et al. | Mar. 28, 1950 |
| 2,635,056 | Powers | Apr. 14, 1953 |
| 2,649,433 | Honel | Aug. 18, 1953 |
| 2,703,486 | Ford | Mar. 8, 1955 |

FOREIGN PATENTS

| | | |
|---|---|---|
| 483,897 | Canada | June 10, 1952 |